United States Patent Office 2,812,985
Patented Nov. 12, 1957

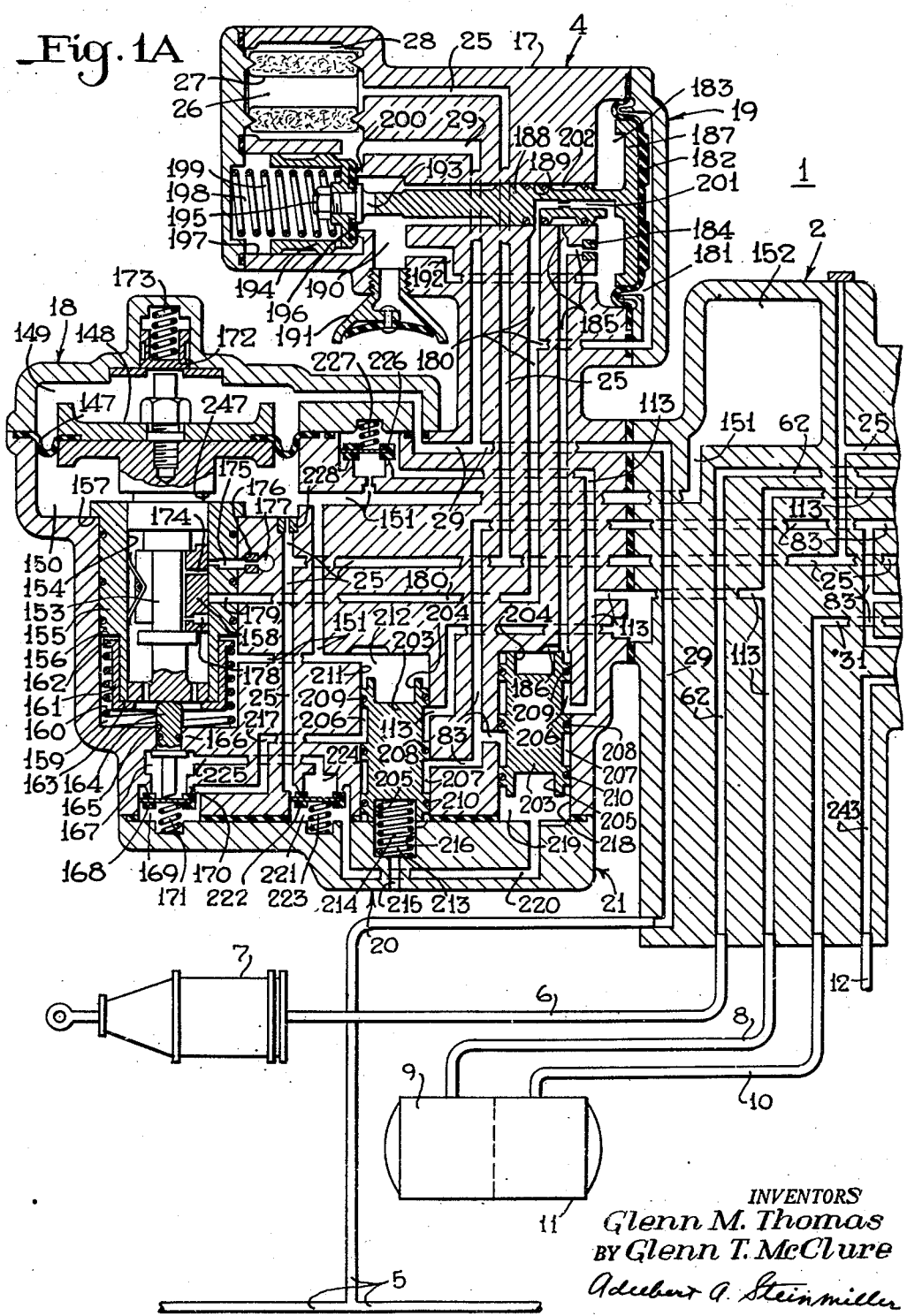

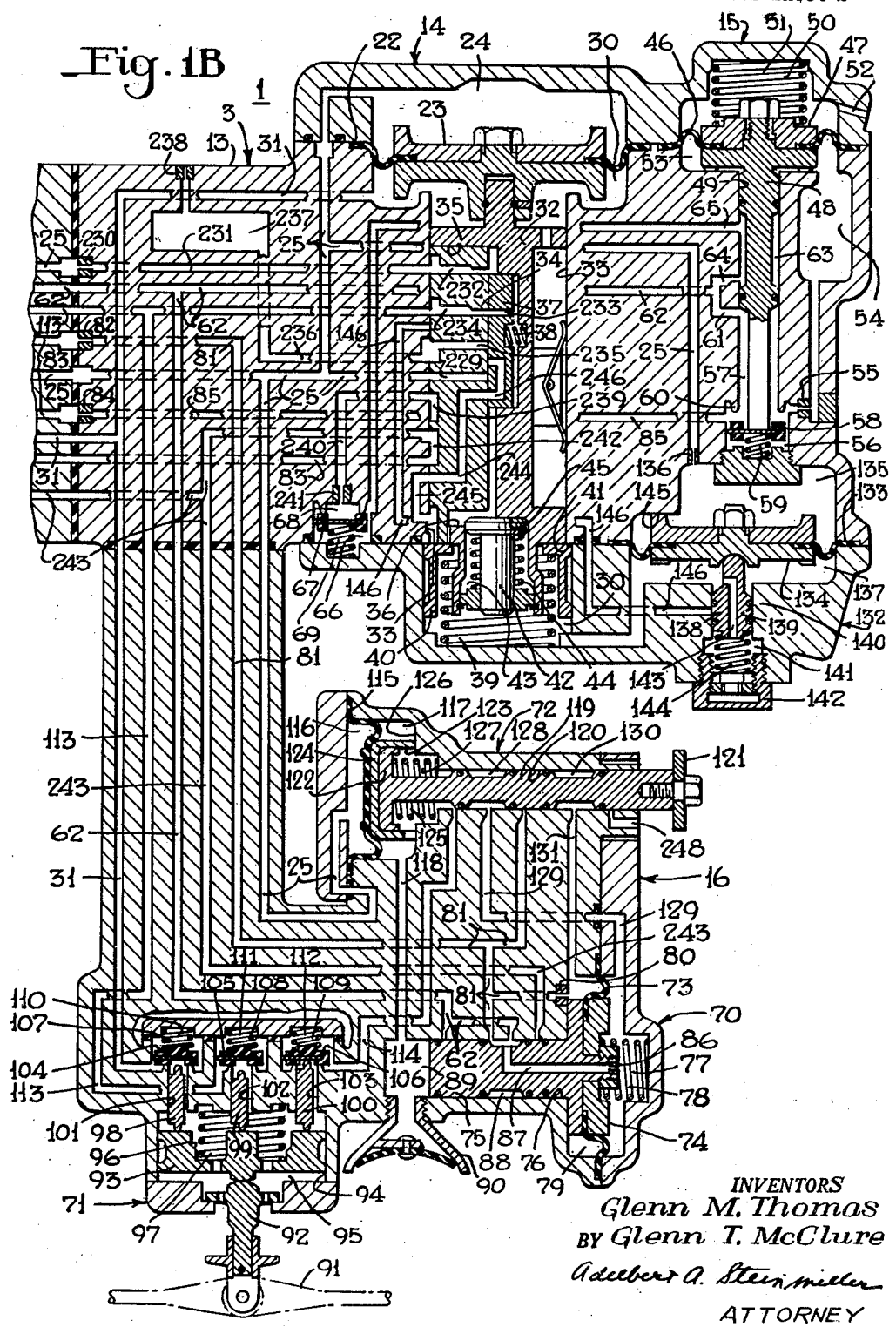

2,812,985

FLUID PRESSURE BRAKE APPARATUS

Glenn M. Thomas, Irwin, and Glenn T. McClure, McKeesport, Pa., assignors to Westinghouse Air Brake Company, Wilmerding, Pa., a corporation of Pennsylvania Application April 8, 1955, Serial No. 500,060

14 Claims. (Cl. 303—35)

This invention relates to fluid pressure brake apparatus and more particularly to improvements in fluid pressure brake apparatus of the type which responds to a service rate of reduction in pressure in a brake pipe to supply fluid under pressure from an auxiliary reservoir to a brake cylinder device; and which responds to an emergency rate of brake pipe reduction to supply fluid under pressure from both the auxiliary reservoir and an emergency reservoir to said brake cylinder device, for correspondingly controlling the degree of application of brakes on a railway car or the like; and which responds to an increase in brake pipe pressure to effect a release of brakes and recharge said reservoirs.

Such fluid pressure brake apparatus may be of the well-known Westinghouse "AB" valve type or the type shown and described in the copending application of Glenn T. McClure, U. S. Serial No. 357,984, filed May 28, 1953; certain improvements in the apparatus disclosed in said application having been proposed and disclosed in the copending application of Glenn T. McClure and John W. Rush, U. S. Serial No. 496,250, filed March 23, 1955. Both of the aforementioned applications have been assigned to the assignee of the present invention.

The principal object of the invention is to provide an improved and relatively low cost commercial brake apparatus of the above general type, which embodies desirable features of the "AB" valve and also incorporates improvements in the arrangements proposed in the aforementioned copending applications.

Another object is to provide an improved brake apparatus of the type described in the preceding object, characterized by novel means for releasing fluid under pressure from the auxiliary reservoir into a vented volume, preferably the quick service volume, for insuring prompt operation of a service valve device to a position for releasing brakes, if due to slide valve friction or other causes, such operation tends to be delayed.

Another object is to provide an improved brake apparatus of the type described in the preceding objects, further characterized by an accelerated release selector valve device and a high pressure valve device, which are operative in generally the same manner as described in the aforementioned copending application of McClure and Rush and which, according to the present invention, comprises valve members which are not only interchangeable but are also reversible, end for end, for thereby not only desirably reducing the variety of parts which must be stocked for use with the apparatus but also facilitating assembly thereof and reducing the possibility of improper assembly.

A further object is to provide an improved brake apparatus of the type described in the preceding objects, further characterized by an improved brake cylinder reapplication valve device and an improved brake cylinder release valve device, whereby when the reapplication valve device is manually moved to a position for causing a reapplication of brakes (following a manual release of brakes with the brake pipe vented), fluid under pressure will be supplied to a control chamber at one side of the brake cylinder release valve diaphragm and simultaneously released from a chamber at the opposite side of said diaphragm for assuring prompt and positive operation of the brake cylinder release valve device from a cut-off position to a normal position for closing off the brake cylinder device from atmosphere and supplying fluid under pressure from a brake cylinder supply communication to said brake cylinder device for reapplying brakes in the manner hereinafter to be described.

Other objects and advantages will become apparent from the following more detailed description of the invention and from the accompanying drawings, wherein the Figs. 1A and 1B, when taken together, such that the right-hand edge of Fig. 1A is matched to the left-hand edge of Fig. 1B, constitute a diagrammatic view of a fluid pressure brake apparatus embodying the invention.

DESCRIPTION

As shown diagrammatically in the drawings, the improved brake apparatus comprises on each car a brake controlling valve device 1 which, in turn, comprises a pipe bracket portion 2, on oppositely arranged faces of which are suitably mounted a service portion 3 and an emergency portion 4. To the pipe bracket portion 2 is suitably connected a branch of the usual brake pipe 5, which pipe is adapted to extend through the train and in which the pressure of fluid is adapted to be varied in the well-known manner by manual operation of the usual engineer's automatic brake valve device (not shown) provided on the locomotive; and to said pipe bracket portion are also connected a pipe 6 leading to a conventional type brake cylinder device 7, a pipe 8 leading to an emergency reservoir 9, a pipe 10 leading to an auxiliary reservoir 11, and a pipe 12 leading to the usual brake cylinder pressure retaining valve device (not shown), which device is manually adjustable so as to retain, if desired, a pressure of as much as 20 p. s. i. in said brake cylinder device during a brake releasing operation, although in the usual case and as will hereinafter be assumed, it is adjusted so as to open the pipe 12 to atmosphere and thus permit complete release of brake cylinder pressure.

The service portion 3 comprises a sectionalized casing 13, in which are formed and in part defined by the various sections thereof, a service valve device 14, a combined quick service limiting and inshot valve device 15, and an improved brake cylinder release and reapplication valve device 16.

The emergency portion 4 comprises a sectionalized casing 17, in which are formed and in part defined by the various sections thereof, an emergency valve device 18, a brake pipe vent valve device 19, an improved accelerated release selector valve device 20, and an improved high pressure valve device 21.

The service valve device 14 comprises an annular flexible diaphragm 22 suitably clamped adjacent its outer peripheral edge between sections of the casing 13 and adjacent its inner peripheral edge between parts of a diaphragm follower assemblage 23. The diaphragm 22 is subject at one side to pressure of fluid in a control chamber 24 that is constantly open to the brake pipe 5 by way of a passage 25 that leads through the casing 13, pipe bracket portion 2, and casing 17 to a chamber 26 within an annular air strainer 27, and through said strainer, and an annular chamber 28 encircling said strainer, to a brake pipe passage 29. The service valve diaphragm 22 is subject at the opposite side to pressure of fluid in a chamber 30 which is constantly open to the auxiliary reservoir 11 by way of a passage 31 and the pipe 10.

A stem 32, which is coaxially connected to the follower assemblage 23, is slidably mounted in a bore 33 formed in the casing 13 and open at one end to the chamber 30. A main slide valve 34, slidable upon a suitable seat formed in the wall of the bore 33, is mounted with a certain degree of lost motion between two shoulders 35, 36 provided on the stem 32; said shoulder 35 being adjacent the end of said stem nearest the diaphragm 22. An auxiliary slide valve 37, disposed in a recess in the stem 32 for positive movement therewith, is urged by a spring 38 into engagement with a seat formed on the main slide valve 34.

Under a condition hereinafter to be described, the service valve device 14 is adapted to assume a release position, in which it is shown in the drawing. In this position, the shoulder 35 of the stem 32 engages the main slide valve 34; and said stem adjacent its free end operatively engages, but does not effect compression of, the usual helical return spring 39 that is retained in a cage 40 which, in turn, engages a shoulder 41 in the casing 13 for limiting the degree of extension of said spring in the direction of the diaphragm 22; and a plunger 42, that is accommodated in an opening 43 extending centrally inward from said free end of the stem 32, is projected by a suitably confined helical stabilizing spring 44 into engagement with a shoulder 45 formed in said stem at the inner end of said opening, such that said plunger extends slightly beyond the shoulder 36 in the direction of the diaphragm 22 but does not engage the adjacent end of said main slide valve. The various fluid pressure connections established by the main slide valve 34 and auxiliary slide valve 37 of the service valve device 14, when the latter is in its release position, will be explained in subsequent description of operation.

The combined quick service limiting and inshot valve device 15 comprises an annular flexible diaphragm 46 that is clamped adjacent its outer peripheral edge between sections of the casing 13 and adjacent its inner peripheral edge between parts of a diaphragm follower assemblage 47. Preferably formed integrally with one of the parts of the follower assemblage 47 is a spool valve 48 having slidable, sealing engagement with the wall of an aligned bore 49 in the basing. The diaphragm 46 is subject at its side opposite the spool valve 48 to pressure of a helical regulating spring 50 in a chamber 51 that is constantly open to atmosphere by way of a casing port 52; and said diaphragm 46 is subject at the other side to pressure of fluid in a chamber 53 that is constantly open to a volume 54 which, in turn, is open by way of a baffle choke 55 to a chamber 56 that is adjacent the end of the bore 49 farthest from the diaphragm 46. For normally preventing fluid pressure communication between the chamber 56 and an annular cavity 57 surrounding a reduced diameter portion of the spool valve 48 adjacent its projecting end, there is provided an inshot check valve 58 which is urged by a helical bias spring 59 in the chamber 56 into engagement with an annular valve seat rib 60 encircling the lower end of the bore 49, as viewed in the drawing.

When the pressure of fluid in the chamber 53 and volume 54 is less than a preselected value, such as 10 p. s. i., the spring 50 is effective to maintain the valve device 15 in a normal position, in which it is shown in the drawing. In this position, the projecting end of the spool valve 48 abuttingly engages and holds unseated the check valve 58 against pressure of the spring 59 for connecting the chamber 56 via the cavity 57 to a port 61 in the casing, which port is constantly open to the brake cylinder device 7 by way of a brake cylinder passage 62 and the pipe 6. And also, with the valve device 15 in normal position, an elongated annular cavity 63 formed in the spool valve 48 connects a port 64 that is constantly open to the brake cylinder passage 62 to a passage 65 that leads to a chamber 66 at one side of a quick service back-flow check valve 67, at the opposite side of which is a chamber 68.

The check valve 67 prevents flow from the chamber 66 to the chamber 68 but permits flow in the reverse direction. A helical bias spring 69 in the chamber 66 urges the check valve 67 to a seated position for normally closing off the chamber 68 from the chamber 66.

The improved brake cylinder release and reapplication valve device 16 comprises an improved brake cylinder release valve device 70, a reservoir release valve device 71, and an improved brake cylinder reapplication valve device 72.

The improved brake cylinder release valve device 70 comprises an annular flexible diaphragm 73 that is clamped adjacent its outer peripheral edge between sections of the casing 13 and adjacent its inner peripheral edge between parts of a diaphragm follower assemblage 74. Preferably formed integrally with one of the parts of the follower assemblage 74 is a cylindrical slide valve 75 having sealing, slidably guided engagement with the wall of an aligned bore 76 in the casing 13. The diaphragm 73 is subject at its side opposite the slide valve 75 to pressure of fluid in a chamber 77 and also to action of a helical bias spring 78; and said diaphragm is subject at the other side to pressure of fluid in a chamber 79 that is constantly open by way of a baffle choke 80, a passage 81, and a brake cylinder controlled build-up choke 82 to a passage 83, one branch of which is open by way of a choke 84 and a passage 85 to the chamber 56 of combined quick service limiting and inshot valve device 15. The chamber 77 is constantly open by way of a choke 86 and an opening 87 in the slide valve 75 to an elongated annular cavity 88 formed in said slide valve intermediate its ends. The free end of the slide valve 75 cooperates with the base and adjacent wall of the bore 76 to define a chamber 89 that is constantly open to atmosphere by way of a so-called vent protector 90.

The valve device 70 is biased by the spring 78 to a normal position, in which it is shown in the drawing. In this position, the cavity 88 connects a branch of the passage 81 to a branch of the brake cylinder passage 62.

The reservoir release valve device 71, also referred to in the art as the triplex release valve device, is provided for permitting release of fluid under pressure from the auxiliary reservoir 11 and emergency reservoir 9, and also from the brake cylinder device 7. This valve device 71 comprises a handle 91 that is pivotally connected to one end of an operating stem 92, the opposite end of which is provided with a cam surface that engages a follower surface formed on a depending portion of a cylindrical lifting member 93 that is slidably mounted in a bore 94 that in part defines an atmospheric chamber 95. Formed in the upper surface, as viewed in the drawing, of the member 93 is an annular recess 96, the base of which provides a spring seat for a helical spring 97 that is provided in the chamber 95 and backed up by the end wall of said chamber for urging said member downward into engagement with the stem 92. Engaging the aforementioned upper surface of the member 93 are three fluted lift rods 98, 99, 100 which are slidably mounted in bores 101, 102, 103, respectively, and are adapted to abuttingly engage and unseat corresponding check valves 104, 105, 106 against resistance of bias springs 107, 108, 109 that are disposed in chambers 110, 111, 112, respectively, and normally maintain said check valves seated. The chamber 110 is constantly open to a branch of the auxiliary reservoir passage 31; the chamber 111 is constantly open to an emergency reservoir passage 113 that leads via the pipe 8 to the emergency reservoir 9; and the chamber 112 is constantly open to a passage 114 that leads to the reapplication valve device 72 for permitting manual release of brake cylinder pressure in the manner to be explained subsequently.

The lengths of the respective lift rods 98, 99, 100 are such that when the handle 91 is in a normal position, in which it is shown in the drawing and in which it is ineffective to cause manual release of fluid under pressure from either the brake cylinder device 7, auxiliary reservoir 11 or emergency reservoir 9, the lift rod 100 will be in close proximity to, or lightly engage but not unseat, the brake cylinder check valve 106 and also the lift rod 98 will be disposed at a slight distance from the auxiliary reservoir check valve 104, and the lift rod 99 will be disposed at a greater distance from the emergency reservoir check valve 105. The handle 91 is biased to its normal position by action of the spring 97. Upon movement of the handle 91 in a rightward or leftward direction from its said normal position, however, a collar on the stem 92 is adapted to be fulcrumed on the casing 17 for advancing the cam surface of said stem to thereby advance the member 93 sufficiently against resistance of the spring 97 to successively unseat the brake cylinder check valve 100, then the auxiliary reservoir check valve 98 and then the emergency reservoir check valve 99, for thereby defining three distinct operating positions in which one, two or all of said check valves may be unseated, according to the degree of such movement.

According to a feature of the invention, the improved brake cylinder reapplication valve device 72 is adapted to so control manual release of brakes as to prevent such release except when fluid under pressure is vented from the brake pipe 5, and said device is also adapted to automatically reset itself when, after a manual brake release, brake pipe pressure is restored.

The brake cylinder reapplication valve device 72 comprises a flexible diaphragm 115 that is suitably clamped about its outer edge between sections of the casing 13 and separates a control chamber 116 that is constantly open to a branch of the brake pipe passage 25 from a chamber 117 that is constantly open to atmosphere by way of a passage 118 and the atmospheric chamber 89. Arranged coaxially with the diaphragm 115 is a spool valve 119 which has sealing, slidably guided engagement with the wall of an aligned bore 120 formed in the casing 13 and extending from the chamber 117 to the exterior of said casing. Connected to one end of the spool valve 119, which projects exteriorly of the casing 13, is a handle assemblage 121 that may, for sake of illustration, comprise a manually engageable annular plate of larger diameter than the spool valve and suitably secured to said spool valve, as by a cap screw. At its opposite end, the spool valve 119 is provided with a preferably integrally formed piston portion 122 which is slidable within an aligned bore 123 formed in, and opening through the adjacent end of, a cylindrical follower member 124 which is enclosed at its opposite end and rests against the face of the diaphragm 115. When the chamber 116 is charged with fluid under pressure, the diaphragm 115 is adapted to deflect against resistance of a helical bias spring 125 in chamber 117 and shift the spool valve 119 to a normal position, in which it is shown in the drawing, and which position is defined by engagement of the annular end of the member 124 with a stop shoulder 126 formed in the casing; said stop shoulder 126 also being adapted to be engaged by the piston portion 122, under another condition, hereinafter to be described, for limiting the extent of movement of the spool valve 119 in a direction away from the chamber 116 upon application of manual force in said direction to the handle assemblage 121.

With the spool valve 119 in normal position, as just defined, a cavity 127, defined by a reduced diameter portion of said spool valve adjacent its piston portion 122, connects passage 114 to atmospheric chamber 117; an elongated annular cavity 128, formed in said spool valve adjacent the cavity 127, is open solely to a passage 129 leading to the chamber 77 of valve device 70; and an elongated annular cavity 130, formed in said spool valve intermediate the cavity 128 and handle assemblage 121, is open solely to a passage 131 leading to the chamber 79 of said valve device 70.

According to a feature of the invention, the service portion 3 also comprises an improved release insuring valve device 132 for assuring a positive and prompt release of a brake application if excessive slide valve or stem friction in the service valve device 14 tends to delay such prompt release.

This release insuring valve device 132 may, for sake of illustration, comprise an annular flexible diaphragm 133 suitably clamped adjacent its outer peripheral edge between sections of the casing 13 and adjacent its inner peripheral edge between parts of a diaphragm follower assemblage 134. The diaphragm 133 is subject at one side to pressure of fluid in a chamber 135 that is constantly open by way of a baffle choke 136 to a branch of the brake pipe passage 25; and said diaphragm is subject at the opposite side to pressure of fluid in a chamber 137 that is constantly open to the chamber 30 of the service valve device 14 and hence by way of said chamber 30 to the auxiliary reservoir 11. A plunger 138 has sealing, slidably guided engagement with the wall of a bore 139 that is arranged coaxially with the diaphragm 133 and extends through a casing partition 140 separating the chamber 137 from a chamber 141 that is enclosed by a suitable sealing nut 142 having screw-threaded engagement within a threaded opening adjacent the exterior of the casing. The plunger 138 has a through opening 143 which constantly connects the chambers 137, 141 so that opposing fluid pressures acting on the diaphragm 133 will be effective on equal areas thereof, unaffected by the area of said plunger.

A helical regulating spring 144, disposed in the chamber 141 and backed up by the nut 142, acts on the plunger 138 for maintaining the latter in contact with the follower assemblage 134 and through such contact urging the release insuring valve device 132 to a normal position, in which it is shown in the drawing, and which position is defined by contact of the follower assemblage 134 with a stop shoulder 145 formed in the casing 13 adjacent the chamber 135. With the valve device 132 in this position, the plunger 138 is so disposed as to effectively seal off one end of a passage 146 that opens through the wall of the bore 139 and leads to the seat of the main slide valve 34 of the service valve device 14.

The emergency valve device 18 comprises an annular flexible diaphragm 147 suitably clamped adjacent its outer peripheral edge between sections of the casing 17 and adjacent its inner peripheral edge between parts of a diaphragm follower assemblage 148. The diaphragm 147 is subject at one side to pressure of fluid in a chamber 149 that is constantly open to the brake pipe 5 via a branch of the brake pipe passage 29; and said diaphragm is subject at the opposite side to pressure of fluid in a chamber 150 that is constantly open by way of a passage 151 to a quick action chamber 152 in the pipe bracket portion 2. Preferably formed integrally with one of the parts of the follower assemblage 148 is a coaxially arranged stem 153 which projects through the chamber 150 and is slidable in a bore 154 extending through a bushing 155 that, in turn, is disposed within a bore 156 in the casing 17 and has sealing contact with the wall of the latter bore; said bushing having an outwardly directed positioning shoulder 157 which engages that part of the end wall of the chamber 150 which encircles the bore 156. A slide valve 158, which is held between two spaced apart radial shoulders formed on the stem 153 for positive movement with said stem, is slidable on a seat formed in the bushing 155. Disposed in a chamber 159, that is defined in part by the base and adjacent wall of the bore 156 and is constantly open to a branch of the passage 151, is a helical return spring 160 which is adapted to act on the stem 153 through the medium of an annular spring cage 161 that encircles a depending, reduced diameter portion of said bushing. The cage 161 comprises an outwardly directed flange 162 which is engaged by the spring 160 and also comprises an inwardly directed flange 163 which overlies the end of the depending portion of the bushing 155 and is adapted to engage the lower end of the stem 153 if and when said lower end projects exteriorly of the bushing 155 for thereupon causing said spring to resist any further movement of said stem in the direction of the chamber 159; said spring being ineffective for urging said stem in the opposite direction when the flange 163 engages the depending portion of said bushing.

Arranged coaxially with the stem 153 is a rod 164 that has sealing, slidably guided engagement with the wall of a bore 165 which extends through a casing partition 166 separating the chamber 159 from a chamber 167. An accelerated release check valve 168, arranged coaxially with the rod 164, controls fluid pressure communication between the chamber 167 and a chamber 169; said check valve being urged into engagement with an annular valve seat rib 170 encircling the chamber 167 by a helical bias spring 171 in the chamber 169 for normally preventing flow between the chambers 167, 169.

Since the chamber 159 is open to the chamber 150 by way of the passage 151, it will be noted that the opposing fluid pressures acting on the diaphragm 147 will be effective on equal areas thereof, unaffected by the cross-sectional area of the bushing 155 and stem 153.

Under a condition hereinafter to be described, the emergency valve device 18 is adapted to assume a normal or release position, in which it is shown in the drawing, and in which the stem 153 at its lower end engages the flange 163 of retaining cage 161 but does not effect compression of the return spring 160; said lower end thus being flush with the lower end of the bushing 155. With the valve device 18 in its release position, as just defined, the check valve 168 will be seated by pressure of the spring 171; the follower assemblage 148 will be out of engagement with a cage 172 that retains a helical stabilizing spring 173 which is accommodated in a coaxially arranged recess formed in the end wall of the chamber 149, and which cage is suitably retained for limiting the degree of extension of said spring in the direction of the diaphragm 147; a port 174, formed in the slide valve 158 and constantly open to the chamber 159, will be out of registry with a port 175 that is formed in the bushing 155 and constantly open by way of a stabilizing choke 176 to an atmospheric vent port 177 in the casing 17; and a port 178, also formed in the slide valve 158 and constantly open to the chamber 159, will be out of registry with a port 179 that is formed in the bushing 155 and is constantly open to a passage 180 that leads to a chamber 181 in the brake pipe vent valve device 19.

The brake pipe vent valve device 19 comprises a flexible diaphragm 182 that is suitably clamped adjacent its outer peripheral edge between sections of the casing 17 and is subject at one side to pressure of fluid in the chamber 181. At the opposite side of the diaphragm 182 is a chamber 183 that is constantly open by way of a quick action chamber blow-down choke 184 to a passage 185 that leads to a chamber 186 in the high pressure valve device 21. The diaphragm 182 is operatively connected through the medium of a diaphragm follower 187 to a coaxially arranged spool valve 188 that is preferably formed integrally with said follower and has sealing, slidably guided engagement with the wall of an aligned bore 189 in the casing 17; said bore being open at one end to the chamber 183 and at the opposite end to a chamber 190. The chamber 190 is constantly open to atmosphere by way of a vent protector 191 and is also constantly open to the chamber 183 by way of a passage 192. The spool valve 188 projects exteriorly of the bore 189 into the atmospheric chamber 190, and at its projecting end abuttingly engages a stem 193 having a collar between which and the adjacent recessed surface in an annular, inwardly directed flange formed at one end of an annular member 194, is suitably clamped, as by a cap screw 195, an annular vent valve 196, that is preferably formed of resilient material. The member 194 is slidably mounted in a casing bore 197 which is coaxially arranged with, and of larger diameter than, the bore 189; said bore 197 defining a chamber 198 that is constantly open to the brake pipe 5 via a branch of the brake pipe passage 29. The vent valve 196 controls fluid pressure communication between the brake pipe chamber 198 and the atmospheric chamber 190.

A helical bias spring 199 in the chamber 198 acts on the member 194 for urging the vent valve 196 into engagement with an annular valve seat rib 200, formed by a projecting part of the casing 17 encircling the chamber 190.

When the chamber 181 is devoid of fluid under pressure, the vent valve device 19 is adapted to assume a closed position, in which it is shown in the drawing, and in which the vent valve 196 is seated by action of the spring 199 which is also effective to position the spool valve 188 such that a restricted passageway 201 therein connects the chamber 183 to a branch of the passage 180 and an elongated annular cavity 202 therein is in sole registry with a branch of the passage 185.

According to a feature of the invention, the improved accelerated release selector valve device 20 and the improved high pressure valve device 21 each comprise a cylindrical valve member 203 of identical size and of symmetrical end-for-end configuration and thus not only interchangeable in either device but also reversibly usable within each such device. Each member 203 has coaxially arranged bores 204, 205 of the same diameter extending equal distances inwardly from opposite ends thereof and also has two spaced apart, elongated annular cavities 206, 207 which are of equal length and commence at equal distances from the respective ends of said valve member and extend toward each other, terminating at equal distances from said respective ends. Each valve member 203 is also provided, intermediate the cavities 206, 207, with a groove accommodating an O-ring seal 208; and intermediate the cavity 206 and adjacent end of said valve member with a groove accommodating an O-ring seal 209; and intermediate the cavity 207 and opposite end of said valve member with a groove accommodating an O-ring seal 210.

In the valve device 20, the valve member 203 is slidably mounted in a bore 211 in the casing 17, such that the O-ring seals 208, 209, 210 sealingly engage the wall of said bore. This valve member 203 is subject at one end to pressure of fluid in a chamber 212 that is constantly open via a branch of the passage 151 to the quick action chamber 152, and is subject at the opposite end to pressure of a helical spring 213 in a chamber 214 constantly open to atmosphere via a vent port 215 through the casing 17; said chamber being defined in part by a coaxially arranged, bore-like recess 216 formed in a cover plate section of said casing removably securable in sealed relation to the casing body and which encloses the outer end of the bore 211.

It will be noted, in view of the symmetrical configuration of the valve member 203, as above described, the base of either the bore 204 or bore 205 may serve as the seat for the spring 213, thereby greatly facilitating, and saving time during, assembly of the brake apparatus. Also the compressed length of the spring 213 is such as to prevent assembly of the apparatus if said spring is erroneously inserted in the chamber 212, instead of in the chamber 214.

When the chamber 212 is charged with fluid under pressure, the valve member 203 will assume a normal position, in which it is shown in the drawing, and in which position it engages the casing 17 in encirclement of the recess 216, against resistance of the spring 213. Assuming that the valve device 20 has been assembled with the bore 205 adjacent the recess 216, then with valve member 203 in normal position, the cavity 206 will connect a branch of the emergency reservoir passage 113 to a passage 217 that is constantly open to the chamber 169; and the cavity 207 will be in sole registry with a branch of the passage 83. However, when pressure in the chamber 212 is reduced below, say about 35 p. s. i., the spring 213 will shift the valve member 203 to a back-dump position in which it engages the end wall of the chamber 212. During movement to this position, the cavity 206 will successively disconnect the passage 113 from the passage 217, and then the cavity 207 will connect said passage 217 to the passage 83.

In the valve device 21, the valve member 203 is slidably mounted in a bore 218 in the casing 17, such that the O-ring seals 208, 209, 210 sealingly engage the wall of said bore. This member 203 is subject at one end to pressure of fluid in the chamber 186 and at the opposite end to pressure of fluid in a chamber 219 that is constantly open by way of a passage 220 to a chamber 221, which is at one side of a back-flow check valve 222 and is constantly open to a branch of the brake pipe passage 25; said check valve normally being urged by a helical bias spring 223 in the chamber 221 to a seated position, in which it is shown in the drawing, for preventing fluid pressure communication between the chamber 221 and a chamber 224 that is at the other side of said check valve and is constantly open by way of a passageway 225 to the chamber 167.

When brake pipe pressure in the chamber 219 preponderates over the opposing pressure of fluid in chamber 186, the valve member 203 of high pressure valve device 21 will assume a normal position, in which it is shown in the drawing and in which it engages the end wall of chamber 186. Assuming that the valve device 21 is assembled such that bore 204 of valve member 203 in part defines the chamber 186, then with said valve member in normal position, the cavities 206, 207 will be open solely to a branch of the emergency reservoir passage 113, and a branch of the passage 83, respectively. When, however, pressure in the chamber 186 preponderates over pressure in the chamber 219, the valve member 203 will shift to a supply position, in which it engages the end wall of the chamber 219. During movement to this position, the cavity 207 will successively be disconnected from the passage 83 and then cavity 206 will connect the passage 113 to the passage 83.

It will now be noted that by virtue of the previously noted symmetrical configuration of the valve member 203, the connections just described would be effected even if said member, in either valve device 20 or 21, were assembled with its ends in reverse relation to that assumed; and also the valve member 203 of the valve device 21 is interchangeable with that of the valve device 20, thereby desirably reducing the variety of parts which must be manufactured and stocked for use with the improved apparatus.

A spill-over check valve 226 provided in the emergency portion 4 is interposed between respective branches of the quick action passage 151 and the emergency reservoir passage 113 for permitting release of fluid under pressure from the quick action chamber 152 and chamber 150 into the emergency reservoir 9 and preventing flow in the reverse direction; said check valve being urged to a seated position by pressure of a helical spring 227 arranged at the emergency reservoir side of said check valve for normally closing off the passages 151, 113 from each other.

OPERATION

Initial charging of the apparatus

Assume that the brake apparatus is devoid of fluid under pressure. To initially charge this apparatus, the operator, in accordance with the usual practice, moves the handle of the aforementioned engineer's brake valve device (not shown) to its release position for supplying fluid at main reservoir pressure, of say 110 p. s. i., to the brake pipe 5 at the locomotive in by-pass of the usual feed valve (not shown); and then when said brake pipe has been charged to substantially its normal operating value, which is generally about 70 p. s. i. in freight service, the operator moves said handle to a running position, in which further supply to the brake pipe is by way of the feed valve, which operates to maintain brake pipe pressure at its chosen normal operating value.

As fluid under pressure is thus supplied to the brake pipe 5, it will flow, on a particular car, via respective branches of the passage 29 to the chamber 149 of emergency valve device 18 and also through the strainer 27 and chamber 26 to the brake pipe passage 25, whence it will flow via a branch of the latter passage and at the rate controlled by a charging choke 228, to the chamber 150 of the emergency valve device 18. From the chamber 150 fluid under pressure will flow via respective branches of the passage 151 to the chamber 159 of the valve device 18, to the quick action chamber 152 and to the chamber 212 of the accelerated release selector valve device 20; and when pressure in the chamber 212 exceeds the illustrative 35 p. s. i., the valve member 203 of the latter device will shift, against resistance of the spring 213, to its normal position (in which it is shown), for successively disconnecting the passage 83 (which is vented in the manner to be described) from passage 217 and then connecting the emergency reservoir passage 113 to said passage 217, such that the chamber 169 beneath the accelerated release check valve 168 will thereupon be charged with fluid under pressure from the emergency reservoir 9, which reservoir is also being charged in the manner to be described presently.

It should be noted that during initial charging the emergency valve device 18 will initially assume an accelerated release position, hereinafter to be defined, in which the check valve 168 is unseated; however, since brake pipe pressure will be higher than emergency reservoir pressure during initial charging, the back-flow check valve 222 will prevent return flow from the emergency reservoir 9 into the brake pipe 5 despite unseating of the check valve 168 and movement of the accelerated release valve device 20 to normal position, as just described. Upon substantial equalization of pressures in the chamber 149, 150, toward completion of initial charging, the spring 160 will shift the valve device 18 to normal position, in which it is shown.

Meanwhile, fluid under pressure will also flow via another branch of the brake pipe passage 25, the chamber 221 beneath the back-flow check valve 222, and the passage 220 to the chamber 219 of the high pressure valve device 21 for causing its valve member 203 to promptly shift to normal position, if not already there, in which the emergency reservoir passage 113 is disconnected from the passage 83, this result being obtained because the chamber 186 is open to atmosphere via the passage 185, choke 184, chamber 183 of the vent valve device 19, passage 192 and atmospheric chamber 190; said vent valve device being maintained in its closed position, in which it is shown in the drawing, under the combined effect of brake pipe pressure and pressure of the spring 199 in the chamber 198 due to the absence of opposing pressure in chamber 181 which is open to atmosphere via passage 180, restricted passageway 201 and vented chamber 183.

Meanwhile, fluid under pressure will also flow via another branch of the brake pipe passage 25 to the chamber 24 of the service valve device 14, causing the same to assume its previously defined release position, in which it is shown in the drawing. In this position, fluid under pressure will flow via one branch of the brake pipe passage 25 into a port 229 in the main slide valve 34, which port is then blanked off by the auxiliary slide valve 37; fluid under pressure will also flow through another branch of passage 25, an auxiliary reservoir charging choke 230, a passage 231 and a port 232 in said main slide valve and then around the stem 32 to the chamber 30 at the under side of the diaphragm 22. Since the chamber 30 is constantly open to the chamber 137 of the release insuring valve device 132 and to the passage 31, fluid under pressure thus supplied to the chamber 30 will flow to said chamber 137 and passage 31. Fluid under pressure will then flow via one branch of the passage 31 to the chamber 110 above the check valve 104 of the reservoir release valve device 71, and via another branch of said passage 31 and the pipe 10 to the auxiliary reservoir 11 for charging said chamber and reservoir at the restricted rate controlled by said charging choke; it being noted that by virtue of previously described unrestricted supply of fluid under pressure from the brake pipe 5 to the chamber 24 and restricted supply to the chamber 30, the service valve device 14 will be maintained in its release position. Also, with the valve device 14 in this position, fluid under pressure will concurrently flow from the chamber 30 through a port 233 in the auxiliary slide valve 37 and a restricted port 234 in the main slide valve 34 into the emergency reservoir passage 113; whence it will flow at the restricted rate controlled by said port 234 via branches of the latter passage to the emergency reservoir 9 for charging the latter, to the chamber 111 above the check valve 105 of the reservoir release valve device 71, and to the upper side of the spill-over check valve 226.

Also, with the valve device 14 in release position, the passage 146 will be blanked off by the main slide valve 34; one end of a port 235 in the main slide valve 34 will be blanked off by the auxiliary slide valve 37, and the other end of said port will be in registry with a passage 236 leading to a quick service volume 237 that is constantly open to atmosphere via a choke 238, which is provided to prevent too sudden and vicious a reduction in brake pipe pressure during preliminary quick service activity hereinafter to be described; a cavity 239 in said main slide valve will be in sole registry with a passage 240 that leads via a quick service choke 241 to the chamber 68 above the quick service back-flow check valve 67; another cavity 242 in said main slide valve will connect a branch of the passage 83 to a passage 243, one branch of which leads to atmosphere via the pipe 12 and the other branch of which is blanked off by the slide valve 75 of the brake cylinder release valve device 70; and a service port 244 in said main slide valve connects a passage 245 open to the chamber 30 with one end of a passageway 246 in said auxiliary slide valve, the other end of the passageway is blanked off by the main slide valve, such that auxiliary reservoir pressure in said passageway will partially offset auxiliary reservoir pressure pressing the auxiliary slide valve 37 to its seat on the main slide valve 34 and thus somewhat reduce auxiliary slide valve friction.

Meanwhile, fluid under pressure will also flow via another branch of the brake pipe passage 25 through the baffle choke 136 to chamber 135 of the release insuring valve device 132. If the pressure in chamber 135 exceeds auxiliary reservoir pressure in the chamber 137 by a pre-selected degree, such as 1½ p. s. i., as determined by the value of spring 144, the diaphragm 133 will deflect downwardly and shift the valve device 132 to a release insuring position, defined by contact of the follower assemblage 134 with the end wall of the chamber 137 and in which position the auxiliary reservoir chamber 137 is connected to release passage 146; but since the latter passage is blanked off by the main slide valve 34 of valve device 14, as above noted, when the latter device is in release position, as during initial charging, this connection is of no consequence at this time and hence fluid under pressure will not be released from the auxiliary reservoir 11 via the chamber 137 and passage 146. As soon as auxiliary reservoir pressure in chamber 137 increases to within the illustratively assumed 1½ p. s. i. of brake pipe pressure, as noted in the chamber 135, the spring 144 will shift the release insuring valve device 132 to its normal position, in which it is shown, and in which the passage 146 is sealed off from the chamber 137.

Meanwhile, fluid under pressure will also flow via another branch of the brake pipe passage 25 to the chamber 116 of the brake cylinder reapplication valve device 72 and thus cause the diaphragm 115 to deflect against resistance of the spring 125 for shifting said valve device to its previously defined normal position, in which it is shown. The handle 91 of reservoir release valve device 71 will be in its previously defined normal position, as shown, under action of the spring 97.

Since the chamber 79 of the brake cylinder release valve device 70 is open to atmosphere via the choke 80, passage 81, choke 82, passage 83, cavity 242 of the main slide valve 34 of valve device 14, passage 243 and pipe 12, said valve device 70 will be in its normal position under action of the spring 78. With valve device 70 in this position, the brake cylinder device 7 will be opened to atmosphere via the pipe 6, passage 62, cavity 88 of the release slide valve 75 and the passage 81, which is open to atmosphere via communication just described; and also the chamber 77 of valve device 70 will be vented by way of the choke 86, opening 87, cavity 88 and said passage 81.

Since the chamber 53 and volume 54 of the combined quick service limiting and inshot valve device 15 are open to atmosphere via the choke 55, chamber 56, passage 85, choke 84, passage 83, choke 82 and the passage 81, which is vented in the manner just described, the spring 50 in chamber 51 will be effective to maintain said valve device in its normal position, in which it is shown.

If during initial charging, the operator leaves the handle of the aforementioned engineer's automatic brake valve device in its release position for too long a period, the quick action chamber 152 on the cars near the locomotive may tend to become overcharged by flow through the choke 228; but such overcharge will be dissipated by way of the passage 151, spill-over check valve 226 and passage 113 into the emergency reservoir 9, which is of relatively large capacity, for thereby preventing the possibility of an undesired operation of the emergency valve device 18 upon a subsequent reduction in brake pipe pressure to its normal operating value responsive to movement of said handle to its running position.

At the completion of initial charging, all of the components of the improved brake apparatus will be in the respective positions in which they are shown in the drawing.

*Service application of brakes*

With the apparatus fully charged and brake pipe pressure at its normal operating value, to initiate a service application of brakes the operator moves the handle of the engineer's brake valve device to a service position for effecting a service rate of reduction in brake pipe pressure at the locomotive; and then when brake pipe pressure has been reduced a degree corresponding to the degree of application desired, the operator moves said handle to a lap position for bottling up fluid in the brake pipe at the desired reduced pressure, in accordance with the usual practice.

On a particular car, as brake pipe pressure is thus reduced, the choke 230 will restrict back flow of fluid under pressure from the auxiliary reservoir 11 into the brake pipe 5 to such an extent that as soon as brake pipe pressure in the chamber 24 of the service valve device 14 reduces below auxiliary reservoir pressure in the chamber 30 by a preselected degree, such as one-half p. s. i., the diaphragm 22 will deflect upwardly and thus shift the stem 32 and auxiliary slide valve 37 relative to the stationary main slide valve 34 for causing said auxiliary slide valve to lap off the ports 232, 234 in the main slide valve and thus cut off the auxiliary reservoir 11 from the brake pipe 5 and the emergency reservoir 9 from said auxiliary reservoir, respectively.

When these ports 232, 234 are thus lapped off, plunger 42 in the lower end of the stem 32 will engage the lower end of the main slide valve 34, which is pressed to its seat by auxiliary reservoir pressure in the chamber 30 and thus offers considerable resistance to movement. Upon a slight further reduction in brake pipe pressure, such as an added one-half p. s. i., relative to auxiliary reservoir pressure, a sufficient pressure differential will be developed across the diaphragm 22 to overcome the opposing force exerted by the spring 44 on the plunger 42 and thus enable said diaphragm to continue its upward deflection for thereby further shifting the auxiliary slide valve 37 relative to the stationary main slide valve 34 to a position, hereinafter referred to as the preliminary quick service position of the valve device 14 and defined by engagement of the shoulder 36 with the lower end of said main slide valve. It should be noted that the spring 44 offers sufficient resistance to such upward deflection of diaphragm 22 as to prevent normal small fluctuations in brake pipe pressure from causing an undesired movement of valve device 14 to said preliminary quick service position.

With the valve device 14 in this position, the auxiliary slide valve passageway 246 connects the main slide valve ports 229, 235, thus permitting fluid under pressure to flow from the brake pipe passage 25 through port 229, passageway 246, port 235 and passage 236 to the quick service volume 237 which is open to atmosphere via the choke 238. Brake pipe pressure will thus be dumped at a virtually unrestricted rate into the volume 247 and cause a local, quick service reduction in brake pipe pressure and, by thus initiating a pressure reduction wave rearward through the brake pipe 5, cause similar operation, in serial relation, of the service valve devices 14 on the cars toward the rear of the train for more promptly and uniformly initiating an application of brakes throughout the train.

After the quick service volume 237 has been charged with fluid under pressure, the local quick service reduction in brake pipe pressure will continue, but at the restricted rate controlled by the choke 238, until brake pipe pressure in chamber 24 has been reduced sufficiently relative to auxiliary reservoir pressure in chamber 30 to assure that the diaphragm 22 will deflect upwardly and carry both the main and auxiliary slide valves 34, 37 to a position, hereinafter referred to as a service position of the valve device 14, and which position is defined by engagement of the follower assemblage 23 with the end wall of chamber 24.

With the service valve device 14 in service position, main slide valve port 229 will be disconnected from the brake pipe passage 25 for terminating quick service venting of fluid under pressure from the brake pipe 5 into the quick service volume 237, and fluid under pressure will thereupon be exhausted from said volume via the choke 238. Also, the service port 244 in the main slide valve 34 will now register with passage 83 for permitting fluid under pressure from the auxiliary reservoir 11 to flow via the chamber 30 to said passage 83, thence through the brake cylinder controlled build-up choke 82 and passage 81 to the cavity 88 in slide valve 75 of the release valve device 70. From cavity 88 fluid will then flow via choke 86 to the chamber 77 of valve device 70, with the result that the spring 78 will maintain the latter device in its normal position, as shown, against pressure of fluid concurrently supplied to the chamber 79 via a branch of the passage 81 and the choke 80; and via cavity 88 fluid will also flow from passage 81 to the brake cylinder passage 62 and thence to the brake cylinder device 7.

Also, with the valve device 14 in service position, main slide valve cavity 239 will connect a branch of brake pipe passage 25 to passage 240 for permitting fluid under pressure from the brake pipe 5 to flow via passage 240 and through the continued quick service reduction choke 241 to the chamber 68, unseat the quick service backflow check valve 67 and flow at the rate controlled by said choke 241 to the passage 65, whence it will flow via spool valve cavity 63 of the valve device 15, port 64 and passage 62 to the brake cylinder device 7, augmenting previously described flow to the latter passage via service port 244 as well as continuing to locally reduce brake pipe pressure.

Fluid under pressure supplied from the auxiliary reservoir 11 to the passage 83, as above described, will also initially flow to the brake cylinder device 7 via said passage, choke 84, and passage 85 to the chamber 56, and then past the unseated check valve 58 of valve device 15 and via cavity 57 and port 61 to the brake cylinder passage 62; such communication defining an inshot communication whereby fluid under pressure flows in by-pass of the controlled build-up choke 82 for supplementing flow to the brake cylinder device via said choke 82.

Brake cylinder pressure in passage 62 will also equalize via port 61, cavity 57, unseated check valve 58, chamber 56 and baffle choke 55 into the volume 54 and chamber 53. When brake cylinder pressure as noted in the volume 54 and chamber 53 builds up to the illustratively assumed value of 10 p. s. i., the diaphragm 46 will deflect upwardly against resistance of the spring 50 and carry the spool valve 48 to a position, defining a closed position of valve device 15, in which the spring 59 will effect closure of the inshot valve 58 for terminating flow through the inshot communication, and in which position cavity 63 is disconnected from port 64 for terminating continued quick service activity by terminating flow from the brake pipe 5 to the brake cylinder device 7.

After the valve device 15 thus operates to terminate quick service activity, fluid under pressure will continue to be supplied from the auxiliary reservoir 11 to the brake cylinder device 7 via previously described communication, including the service port 244 of main slide valve 34 and the brake cylinder controlled build-up choke 82, until auxiliary reservoir pressure in chamber 30 of valve device 14 is reduced slightly below brake pipe pressure in chamber 24, pressure in the brake pipe 5 having theretofore been lapped by operation of the engineer's brake valve device; whereupon preponderant pressure in said chamber 24 will deflect the diaphragm 22 and thus move stem 32 and auxiliary slide valve 37 downwardly relative to the stationary main slide valve 34 until the stem shoulder 35 engages the upper end of said main slide valve and such movement is thereupon terminated, thereby defining a service lap position of the valve device 14. In this position, the auxiliary slide valve 37 blanks off the service port 244 for terminating supply of fluid under pressure from the auxiliary reservoir 11 via said port and passage 83 to the brake cylinder device 7, and thus bottling up fluid in the brake cylinder device 7 at a pressure proportional to the chosen reduction in brake pipe pressure.

If a further service reduction in pressure is subsequently effected in the brake pipe 5, the diaphragm 22 will deflect upwardly and then downwardly for first shifting the valve device 14 to its service position and then back to its service lap position so as to provide a corresponding increase in pressure in the brake cylinder device 7, as will be apparent from the above description; it being noted that since brake cylinder pressure will then exceed the illustratively assumed 10 p. s. i., valve device 15 will remain in closed position, in which cavity 63 is disconnected from the brake cylinder passage 62; and hence there will be no quick service venting of fluid under pressure from the brake pipe 5 during this further reduction, despite the fact that main slide valve cavity 239 still connects brake pipe passage 25 to the passage 240 in both the service and service lap positions of the valve device 14. This last connection does, however, permit flow from the brake pipe 5 to the brake cylinder device 7 if brake cylinder pressure should reduce slightly below the illustrative 10 p. s. i., say to 9 p. s. i., due to brake cylinder leakage, and thus cause the diaphragm 46 of valve device 15 to deflect downwardly a distance sufficient to reconnect passages 65, 62 via cavity 63 without having the projecting end of spool valve 48 unseat the inshot valve 58; and after such flow restores brake cylinder pressure to the illustrative 10 p. s. i., the valve device 15 will operate to terminate such flow, in the previously described manner.

Meanwhile, in the emergency portion 4, whenever a service reduction in brake pipe pressure is effected, the pressure in chamber 149 of the emergency valve device 18 will correspondingly reduce until it is slightly below quick action chamber pressure in the chamber 150; whereupon the diaphragm 147 will deflect upwardly and shift the slide valve 158 to a position, defining a service position of the valve device 18, in which the slide valve port 174 registers with the bushing port 175 sufficiently to permit the quick action chamber pressure in the chambers 150, 159, and 152 to blow down, by way of the choke 176 and vent port 177, at substantially the same rate and to the same extent as brake pipe pressure; it being noted that due to the small pressure differential across the choke 228 back flow into the brake pipe 5 will be negligible.

This blow down of quick action chamber pressure, referred to as "breathing," prevents a pressure differential from being developed across the diaphragm 147 sufficient to effect upward movement of the diaphragm and slide valve 158 against compression of the stabilizing spring 173 and thus assures against an undesired emergency application of the brakes, as will be understood from subsequent description. This "breathing" action will continue until, after brake pipe pressure is lapped at the chosen reduced value, the pressure in chambers 150, 159, 152 will have reduced slightly below brake pipe pressure in chamber 149; whereupon diaphragm 147 will deflect downwardly and return the slide valve 158 to the position in which it is shown in the drawing. Thereafter quick action chamber pressure will equalize with brake pipe pressure at the rate controlled by the choke 228.

Since the quick action chamber pressure will never be reduced below the illustrative 35 p. s. i., even during a full service application of brakes, quick action chamber pressure in chamber 212 will maintain the valve member 203 of accelerated release selector valve device 20 in its normal position, in which it is shown, against resistance of the spring 213. Also, since chamber 186 of the high pressure valve device 21 will be opened to atmosphere throughout a service application of brakes, the valve member 203 of said valve device will be maintained in normal position, in which it is shown, by brake pipe pressure in the chamber 219.

During a service application of brakes, fluid will be bottled up in the emergency reservoir 9 at the pressure to which it was charged prior to the brake application, since the auxiliary slide valve 37 will blank off main slide valve port 234 from the auxiliary reservoir chamber 30 upon movement of the service valve device 14 to preliminary quick service position and then upon movement of said valve device to its service and service lap positions said port 234 will be disconnected from the emergency reservoir passage 113.

*Accelerated release of brakes after a service application*

To effect a release of brakes following a service application, the brake pipe 5 is recharged at the locomotive by operation of the aforementioned engineer's automatic brake valve device.

The emergency valve device 18 will respond to a slight, such as .7 p. s. i. preponderance of brake pipe pressure in chamber 149 over quick action chamber pressure in chambers 150, 159 to move against resistance of spring 160 to an accelerated release position, defined by engagement of a shoulder 247 on the stem 153 with the end of bushing 155. In this position, the stem 153 acting through rod 164 unseats the check valve 168, for thereby permitting fluid under pressure to flow from the emergency reservoir 9 to the brake pipe 5 via the emergency reservoir passage 113, cavity 206 of the valve member 203 of device 20 in its normal position, passage 217, chamber 169 and past the unseated check valve 168 into chamber 167 and thence via passage 225 to chamber 224, unseating back-flow check valve 222 and then flowing to brake pipe passage 25. When emergency reservoir pressure has reduced to within about 2 p. s. i. of equalization with brake pipe pressure, the back-flow check valve 222 will be seated by the spring 223; whereupon accelerated release flow from the emergency reservoir 9 to the brake pipe 5 will cease.

This unrestricted flow of fluid under pressure from the emergency reservoir 9 into the brake pipe 5 upon initiation of a release of a service brake application will not only initiate a pressure increase wave rearward through the brake pipe 5 for more promptly and uniformly initiating a release of brakes throughout a long train by causing similar, serial operation of the valve devices 18 on successive rearward cars, but will also generally provide a local boost in brake pipe pressure sufficient to cause prompt downward deflection of the diaphragm 22 of the service valve device 14 for carrying the slide valves 34, 37 downward against inherent friction and thus moving said valve device 14 to its release position, in which it is shown in the drawing.

When, however, a minimum service application of brakes had been in effect and brake pipe pressure was thus reduced only about 5 p. s. i. below emergency reservoir pressure, there is a possibility that with such a low differential between brake pipe pressure and emergency pressures, operation of the emergency valve device 18 to accelerated release position may not effect a sufficiently rapid build up of brake pipe pressure over auxiliary reservoir pressure to cause prompt movement of the service valve device 14 to release position for effecting prompt release of such minimum application, especially if slide valve friction in the latter device is excessive. For this reason the release insuring valve device 132 is provided; said device being operative to its previously defined release insuring position, independently of the emergency valve device 18, if and when brake pipe pressure should exceed auxiliary reservoir pressure by the illustrative 1½ p. s. i., for thereby permitting rapid, unrestricted dumping of auxiliary reservoir pressure into the vented quick service volume 237 by flow via chambers 30, 137, passage 146, slide valve port 235, and passage 236; and if, in an extreme case, the service valve device 14 still has not moved to release position, after charging of said quick service volume, auxiliary reservoir pressure can continue to blow down via the choke 238 until said valve device 14 does so move.

It is to be noted that whenever the service valve device 14 is in either its service lap or its service position, main slide valve port 235 will connect passage 146 to the quick service volume 237 so that this release insuring feature will be available, if needed, in releasing either a service or an emergency application, as will be understood from subsequent description.

Upon movement of the service valve device 14 to release position, the passage 146 will be blanked off by the main slide valve 34. Also the auxiliary reservoir 11 and emergency reservoir 9 will be recharged at restricted rates via branches of the brake pipe passage 25 and communications previously described in connection with initial charging. Also fluid under pressure will be released from the brake cylinder device 7, by flow through passage 62, cavity 88 in slide valve 75 of the brake cylinder release valve device 70, passage 81, choke 82, passage 83, cavity 242 in main slide valve 34 of service valve device 14, passage 243 and the pipe 12 leading to the aforementioned brake cylinder pressure retaining valve device, which, as previously assumed, is adjusted to open pipe 12 to atmosphere; and fluid under pressure will also be released from the volume 54 and chamber 53 of the valve device 15 via choke 55, chamber 56, passage 85, choke 84, and the passage 83 which is open to the vented pipe 12 via communication just described. The brake cylinder release valve device 70 will remain in its normal position, as shown, due to concurrent release of fluid under pressure from the chambers 77, 79 at opposite sides of the diaphragm 73 by flow into the passage 81 and thence to atmosphere via communication just described.

In the case of only a partial release of a service application, the service valve device 14 will return to service lap position when auxiliary reservoir pressure in chamber 30 has been restored from the brake pipe to a value where it slightly exceeds brake pipe pressure in chamber 24, for thereby bottling up fluid in the brake cylinder device 7 at a corresponding reduced pressure. In the case of a complete release of brakes, however, the service valve device 14 will remain in release position for completely releasing brake cylinder pressure.

Meanwhile, in the emergency portion 4, as soon as quick action chamber pressure substantially equalizes with brake pipe pressure via the choke 228, the emergency valve device 18 will be returned to release position by action of spring 160, thereby permitting spring 171 to reseat accelerated release check valve 167.

Upon a complete release of a service application of brakes, all components of the apparatus will once again be in the positions in which they are shown in the drawing.

Emergency application of brakes

To effect an emergency application of brakes, the operator moves the handle of the aforementioned engineer's automatic brake valve device to an emergency position for causing an emergency rate of reduction in pressure in the brake pipe 5 at the locomotive.

Whenever an emergency rate of reduction in pressure in the brake pipe 5 and hence in chamber 149 of emergency valve device 18 on the first car occurs, the diaphragm 147 will deflect upwardly, initially connecting slide valve port 174 to the vent choke 176; but since said choke can only vent quick action chamber pressure at a rate equivalent to a service rate of reduction of brake pipe pressure, a pressure differential will build up promptly across the diaphragm sufficient to shift the follower assemblage 148 upwardly against compression of the stabilizing spring 173 and into engagement with the end wall of the chamber 149, thereby defining an emergency position of the valve device 18, in which the slide valve port 178 registers with bushing port 179 for permitting quick action chamber air to flow via the latter ports and passage 180 to the chamber 181 of brake pipe vent valve device 19.

In view of the restriction in passageway 201, pressure in the chamber 181, acting on the relatively large area of the diaphragm 182, will promptly cause said diaphragm to deflect and shift the spool valve 188 leftward, thereby unseating the vent valve 196 against resistance of brake pipe pressure in chamber 198 and pressure of the spring 199. With the vent valve 196 unseated, fluid under pressure will flow from the brake pipe passage 29 directly to atmosphere via the atmospheric chamber 190 and vent protector 191. As each brake pipe vent valve device 19 operates to thus locally vent brake pipe pressure, it will cause successive operation of the emergency valve device 18 and then the vent valve device 19 on adjacent cars, causing rapid and repeated successive operation of these valve devices 18, 19 through the train for insuring prompt serial movement of the valve devices 18 on other cars to emergency position.

With the vent valve 196 on a particular car thus unseated and with the follower 187 engaging the end wall of chamber 183, the cavity 202 in the spool valve 188 will connect a branch of passage 180 to the passage 185, permitting fluid under pressure to flow from the quick action chamber 152 via ports 178, 179 with the emergency valve device 18 in emergency position, and said cavity 202 to the chamber 186 for promptly shifting the valve member 203 of the high pressure valve device 21 downward against resistance of reduced brake pipe pressure in the chamber 219 such that the cavity 206 connects passage 113 to the passage 83; whereupon fluid under pressure will be supplied from the emergency reservoir 9 to the brake cylinder device 7 by way of the passages 113, 83, choke 82, passage 81, cavity 88 of release slide valve 75, and brake cylinder passage 62.

Meanwhile, during this emergency rate of reduction in brake pipe pressure, the service valve device 14 will have promptly moved to its service position for supplying fluid under pressure from the auxiliary reservoir 11 to the brake cylinder device 7, in the same manner as during a service application of brakes, and thus augmenting flow from the emergency reservoir 9, as just described. It is to be noted that valve device 14 will, during movement to service position, pass through its preliminary quick service position, but this is not important because the brake pipe is being vented more rapidly and effectively by operation of the emergency application valve device 18.

Due to concurrent supply of fluid under pressure to the brake cylinder device 7 from the emergency and auxiliary reservoir 9, 11, the illustrative 10 p. s. i. brake cylinder inshot pressure will quickly be obtained, and the valve device 15 will thereupon move to its upper or closed position, in the manner previously described; and then during the final phase of the emergency application, pressures in the auxiliary and emergency reservoirs 11, 9 will equalize into the brake cylinder device 7 for providing within a very short period of time, such as 8 to 10 seconds, a brake cylinder pressure which is about 20% higher than that obtained during a full service application of brakes. Since, upon completion of brake pipe pressure reduction incident to an emergency application of the brakes, auxiliary reservoir pressure exceeds brake pipe pressure, the service valve device 14 will remain in service position throughout the emergency application. The quick service back-flow check valve 67 will prevent back flow of brake cylinder pressure into the vented brake pipe 5 by way of the cavity 239 while the service valve device 14 is in service position.

Meanwhile, pressure in the quick action chamber 152 will be reduced by previously described flow through emergency slide valve port 178 and spool valve cavity 202 of the vent valve device 19, because a branch of passage 185 is open to atmosphere by way of the quick action chamber blowdown choke 184, and atmospheric chamber 183. This choke 184 so restricts release of quick action chamber pressure and hence release of the pressure in the chamber 181 of the vent valve device 19 as to assure that the vent valve 196 will be held unseated for a chosen period, such as about 60 to 70 seconds, in order to prevent possible damage to the train if the operator should attempt to release the emergency application before the train is fully stopped. At the expiry of this chosen period, quick action chamber pressure in the chamber 181 will have blown down sufficiently to enable the spring 199 to return the vent valve device 19 to normal position, in which it is shown and in which the vent valve 196 is reseated and spool valve cavity 202 disconnects the quick action chamber 152 from the chamber 186 of the high pressure valve device 21; whereupon pressure in said chamber 186 will blow down to atmosphere via the choke 184.

Meanwhile, when quick action chamber pressure, acting by way of passage 151 in the chamber 212 of the accelerated release valve device 20, has reduced below the illustrative 35 p. s. i. the spring 213 will shift the valve member 203 upward, to its back dump position, in which the passage 217 is opened to the passage 83, in preparation for an accelerated release of the emergency application, as will presently be described.

Also, venting of the brake pipe 5 and hence of the chamber 116 of the brake cylinder reapplication valve device 72 during the emergency application will cause spool valve 119 to be shifted leftward under action of the spring 125, but this is of no consequence under the conditions now being discussed. Also the release valve device 70 will be maintained in its normal position, as shown, throughout the emergency application because brake cylinder pressure will be supplied to both sides of the diaphragm 73, in the same manner as described in connection with a service application of brakes.

Accelerated release of brakes after an emergency application

To release an emergency application of brakes, the operator actuates the aforementioned engineer's automatic brake valve device on the locomotive in the manner already described for supplying fluid under pressure to the brake pipe 5 at the locomotive.

On the first car, fluid under pressure thus supplied to the brake pipe passages 29, 25 will promptly shift the emergency valve device 18 to its previously defined accelerated release position, in which the check valve 168 is unseated. So long as auxiliary reservoir pressure exceeds brake pipe pressure, the service valve device 14 will remain in service position, in which the auxiliary reservoir 11 is open by way of service port 244 and previously described communication to the brake cylinder device 7; and hence fluid under pressure from both the brake cylinder device 7 and auxiliary reservoir 11 will flow via the passage 83, cavity 207 in the valve member 203 of accelerated release valve device 20 in back dump position, passage 217, past the unseated accelerated release check valve 168, to passage 225, unseating the back-flow check valve 222, and then flowing via brake pipe passages 25, 29 to the brake pipe 5 for thereby initiating a rapid, serial build-up in brake pipe pressure throughout the train by initiating successive, similar operation of the brake controlling valve devices 1 on the rearward cars; and from brake pipe passage 25 fluid will also flow via chamber 221 below said check valve 222 and passage 220 to the chamber 219 for promptly shifting the valve member 203 of high pressure valve device 21 to its upper or normal position, in which it is shown in the drawing. This flow from the brake cylinder device 7 and auxiliary reservoir 11 into the brake pipe 5, called "back dump," will continue until brake pipe pressure has increased to within about 2 p. s. i. of equalization with combined brake cylinder pressure and auxiliary reservoir pressure; whereupon the spring 223 will seat the back-flow check valve 222 for terminating back dump.

Meanwhile, back dump will reduce auxiliary reservoir pressure; and hence upon seating of the back-flow check valve 222, fluid will be temporarily bottled up in the brake cylinder device 7 and auxiliary reservoir 11 until brake pipe pressure has been increased, by virtue of supply to the brake pipe 5 at the locomotive, to a value sufficiently in excess of auxiliary reservoir pressure to cause the service valve device 14 to move from service position to release position; it being noted that during such movement the service port 244 will successively disconnect said auxiliary reservoir from said brake cylinder device (as the service passes through service lap position) and then when the service valve device attains its release position, the brake cylinder device will be opened to atmosphere via previously described communication including main slide valve cavity 242; also, the auxiliary reservoir 11 will be recharged from the brake pipe 5 via the charging choke 230 and main slide valve port 232, and the emergency reservoir 9 will be recharged from the auxiliary reservoir via chamber 30, auxiliary slide valve port 233, main slide valve restricted port 234 and passage 113, as more fully explained in connection with initial charging.

It will be noted that if the service valve device 14 has not moved to release position by the time brake pipe pressure exceeds auxiliary reservoir pressure by the illustrative 1½ p. s. i., the release insuring valve device 132 will operate, in the manner previously described in connection with release of a service application, to assure such movement promptly by venting auxiliary reservoir pressure into the quick service volume 237.

Meanwhile, as brake pipe pressure is restored, the quick action chamber 152 and chambers 150, 159 will be recharged at the restricted rate controlled by the choke 228. When quick action chamber pressure and hence pressure in the chamber 212 of the accelerated release valve device 20 builds up to the illustrative 35 p. s. i., its valve member 203 will move to its normal or lower position, in which it is shown, for reconnecting the emergency reservoir passage 113 to passage 217; whereupon fluid under pressure can be supplied from the emergency reservoir 11 to the brake pipe 5 for further locally increasing brake pipe pressure if brake pipe pressure has by then not been restored to a pressure within about 2 p. s. i. (as determined by the back-flow check valve spring 223) of emergency reservoir pressure, which was illustratively assumed as 60 p. s. i. following equalization into the brake cylinder device during the emergency application. Subsequently, when, toward the end of the brake releasing operation, quick action chamber pressure has increased to within a few p. s. i. of brake pipe pressure, the spring 160 will shift the emergency valve device 18 from its accelerated release position to its release position, in which it is shown, thereby permitting the spring 171 to reseat the accelerated release check valve 168.

When brakes have been completely released, the various components will be in the respective positions in which they are shown in the drawings.

Operation of the brake cylinder release and reapplication valve device 16

Assuming that the brake pipe 5 is fully charged, brake pipe pressure in chamber 116 will maintain the brake cylinder reapplication valve device 72 in its normal position, in which it is shown in the drawing, and in which cavity 127 in the spool valve 119 will open the chamber 112 above the brake cylinder release check valve 106 of the reservoir release valve device 71 to atmosphere.

Hence under this condition, if it is desired for any reason to manually release fluid under pressure from the reservoirs 11, 9, the handle 91 is shifted laterally for causing the member 93 to be shifted upwardly against resistance of the spring 97 for successively causing the lift rods 100, 98, 99 to unseat the brake cylinder release check valve 106 (without consequence because it is not now connected to the brake cylinder device 7, then the auxiliary reservoir release check valve 104, and then the emergency reservoir release check valve 105, respectively, according to the degree of such lateral movement; and after fluid under pressure has been released to the desired extent from the auxiliary reservoir 11 or from both the auxiliary reservoir and emergency reservoir 9, the handle 91 is released and it will return to normal position under action of spring 97, thereby permitting the check valves 100, 98, 99 to be reseated by pressure of their respective bias springs 109, 107, 108 for terminating such release.

On the other hand, if the brake pipe 5 is vented, such as when the car is on a siding or in a repair shop, brakes will be applied as during an emergency application, and the spring 125 will have shifted the spool valve 119 of brake cylinder reapplication valve device 72 to a position in which the diaphragm 115 abuts the end wall of chamber 116 and in which the brake cylinder device 7 is opened to the chamber 112 above the brake cylinder release check valve 106 via brake cylinder passage 62, cavity 88 in slide valve 75 of valve device 70, opening 87, choke 86, chamber 77, passage 129, cavity 128 in spool valve 119, and passage 114. Hence if it is desired to release fluid under pressure from the brake cylinder device 7, such as for changing brake shoes, the handle 91 of valve device 71 can be moved laterally, as just described, sufficiently to operatively unseat the check valve 106 without unseating the check valve 104, 105 and thus release brake cylinder pressure past the unseated check valve 106 without releasing pressure from the reservoirs 11, 9. The choke 80 is of equal or smaller flow capacity than the choke 86; and therefor upon this release of brake cylinder pressure via the unseated check valve 106, preponderant pressure in the chamber 79 will cause the diaphragm 73 to deflect against resistance of spring 78 and thus shift the slide valve 75 rightward, causing said slide valve to successively blank off passage 81 for retaining pressure in the auxiliary and emergency reservoirs 11, 9 and in the chamber 79 of valve device 70 and then uncover one branch of passage 62 directly to the atmospheric chamber 89 for releasing brake cylinder pressure and thereby releasing brakes; also the cavity 88 will connect another branch of passage 62 to the passage 243 leading to the aforementioned brake cylinder pressure retaining valve device via pipe 12, for releasing pressure in this pipe even if the latter valve device is adjusted to normally retain some brake cylinder pressure, for reasons to be explained presently.

With the brake pipe 5 still vented, in order to reapply brakes after a manual release, the handle 121 is pulled rightward for shifting the reapplication spool valve 119 against resistance of the spring 125 to a position defined by engagement of the piston portion 122 with the stop shoulder 126. In this position, the cavity 128 in the spool valve 119 connects passage 81 to passage 129 for supplying fluid at the combined pressure in the auxiliary and emergency reservoirs 11, 9 to the chamber 77 of release valve device 70; and at the same time, according to a feature of the invention, the cavity 130 in said spool valve 119 connects the passage 131 to a vent passage 248 for thereby releasing fluid under pressure from chamber 79 of said release valve device at an unrestricted rate, abviously faster than it can be supplied via choke 80, with the result that the diaphragm 73 will promptly deflect leftward and shift said release valve device to its normal position, in which it is shown; whereupon manual force may be released from the handle 121 for permitting the spring 125 to shift the spool valve 119 to its extreme left position, in which the piston portion 122 again abuts the member 124 and diaphragm 115 abuts the end wall of chamber 116, and in which position supply of fluid under pressure to the chamber 77 and venting of chamber 79 is terminated. During this movement of the release valve device 70 to its normal position, passage 62 will be successively cut off from the atmospheric chamber 89 and release retainer passage 243; and then passage 62 will be opened via cavity 88 to the passage 81, for permitting fluid at the aforementioned combined pressure to flow via passage 81 to the brake cylinder passage 62 for reapplying brakes. Pressures in the chambers 77, 79 on opposite sides of diaphragm 73 will equalize with this combined pressure via the common passage 81 and respective chokes 86, 80; the spring 78 maintaining said valve device 70 in its normal position.

Manual release and reapplication of brakes can be repeated, in the manner just described, so long as pressure remains in the auxiliary and emergency reservoirs 11, 9.

Instead of effecting a manual reapplication of brakes, as just described, the car may be reconnected in a train, and the brake pipe 5 charged to normal operating value. Brake pipe pressure, as thus noted in chamber 116 of brake cylinder reapplication valve device 72, will cause diaphragm 115 to deflect rightwardly against resistance of the spring 125 until the member 124 engages the stop shoulder 126, whereupon the spool valve 118 will be held in normal position, in which it is shown. Since the chamber 77 of the valve device 70 had been previously vented and chamber 79 charged during the manual release of brake cylinder pressure, the slide valve 75 will be held in its rightward position against resistance of spring 78 until brake pipe pressure has increased above auxiliary reservoir pressure sufficiently to shift the service valve device 14 from service position (where it had remained ever since venting of the brake pipe) to release position; such operation of the service valve device being assisted, if necessary, by previously described operation of the release insuring valve device 132.

During movement of the service valve device 14 to release position, service port 244 will disconnect the brake cylinder device 7 from the auxiliary reservoir 11, and then main slide valve cavity 242 will reconnect the previously vented release retainer passage 243 and pipe 12 to the passage 83, which in turn is open via passage 81 and choke 80 to the chamber 79 of release valve device 70, thereby insuring that pressure in the latter chamber will be reduced sufficiently by backflow through choke 80 to enable the spring 78 to shift said release valve device leftward to its normal position, in which it is shown, and in which communication is reestablished between the service valve device 14 and brake cylinder device 7 for permitting brakes to be controlled in the normal manner according to operation of said service valve device.

It will thus be noted that the brake cylinder release and reapplication valve device 16 is adapted to be automatically reconditioned without manual effort by the operator when the brake pipe 5 is recharged following manual release of brakes on a car on which the brake pipe had previously been vented.

Operation of the service and emergency portion 3, 4 of the brake controlling valve device 1 will, unless otherwise just noted, be substantially the same as previously described in connection with release of an emergency application, except that since the brake cylinder device 7 is vented, only auxiliary reservoir pressure will be back-dumped into the brake pipe 5 when the accelerated release check valve 168 is unseated by movement of the emergency valve device 18 to accelerated release position.

*Summary*

It will thus be seen that an improved and relatively low cost brake apparatus has been provided embodying a release insuring valve device 132 which cooperates with the service valve device 14 to assure that the latter will be positively moved to release position from either service or service lap position if such movement has not occurred by the time brake pipe pressure exceeds auxiliary reservoir pressure by a small degree such as 1½ p. s. i., this result being accomplished by venting auxiliary reservoir pressure through a communication controlled by both valve devices 132, 14 into a previously vented volume, preferably the quick service volume 237, so that a local reduction in auxiliary reservoir pressure of a limited degree will be immediately effected, after which such reduction may continue, if necessary, at a restricted rate through a choke 238 via which said volume is open to atmosphere. The volume 237 and choke 238 prevent a vicious overreduction in auxiliary reservoir pressure.

It will also be seen that the improved apparatus embodies an accelerated release valve device 20 and a high pressure valve device 21, each comprising identical, interchangeable valve members 203 for thereby desirably reducing the quantity of parts which must be stocked for use with such apparatus; said valve members also having end-for-end symmetry for preventing improper assembly by being insertable from either end into the casing.

The improved apparatus also embodies an improved brake cylinder release valve device 70 and a reapplication valve device 72 which are not only of improved structure but also cooperate with other components of a brake release and reapplication valve device 16 to control reapplication of brakes in a new and improved manner, following a manual release of brakes. More specifically, the valve device 72, when moved to a rightward position for manually effecting a reapplication of brakes following a manual release of brakes, will positively vent a chamber 79 at one side of the diaphragm 73 of the valve device 70 as well as recharge the chamber 77 at the other side of said diaphragm for thereby positively and promptly shifting said valve device 70 to its normal position, in which it is shown. Moreover, the recharging of the brake pipe always insures positively the conditioning of the valve device 70 so as to guarantee a brake application when subsequently called for.

Having now described the invention, what we claim as new and desire to secure by Letters Patent, is:

1. In a fluid pressure brake apparatus, the combination of a brake pipe, an auxiliary reservoir, a quick service volume, flow restricting means via which said volume is open to atmosphere, a fluid pressure communication, service valve means comprising two valves having a lost motion connection therebetween, one of said valves being movable relative to the other of said valves responsively to an initial reduction in brake pipe pressure below pressure in said auxiliary reservoir to open said brake pipe to said quick service volume for causing a local quick service reduction in brake pipe pressure for assuring movement of said two valves in unison to a service position in which said communication is opened to said quick service volume and fluid under pressure is supplied from said auxiliary reservoir for applying brakes, said one valve thereafter being movable relative to said other valve to a service lap position for terminating such supply while said other valve maintains said communication opened to said volume, said valves thereafter being movable in unison responsively to a subsequent increase in brake pipe pressure over reservoir pressure to another position for releasing brakes and closing off said communication from said quick service volume and recharging said auxiliary reservoir from said brake pipe at a restricted rate, and release insuring valve means operative whenever brake pipe pressure exceeds auxiliary reservoir pressure by a chosen degree to connect said auxiliary reservoir to said communication, such that if said service valve means has not moved to its said other position at the time the release insuring valve means effects such connection, fluid under pressure in said auxiliary reservoir will be released at a rapid rate into said quick service volume and thereafter will be released at the restricted rate controlled by said flow restricting means for insuring prompt movement of said service valve means to said other position.

2. A fluid pressure brake apparatus comprising, in combination, a brake pipe normally charged with fluid under pressure, an emergency reservoir normally charged with fluid under pressure from said brake pipe, a brake cylinder, a pressure chamber having restricted fluid pressure communication with said brake pipe, means defining a first passageway and a second passageway, accelerated release check valve means normally seated for preventing flow from said first passageway to said second passageway, emergency brake controlling valve means responsive to an emergency rate of reduction in brake pipe pressure to cause establishment of communication via which fluid under pressure is vented from said pressure chamber to below a chosen value and responsive to a subsequent increase in brake pipe pressure to unseat said accelerated release check valve means for connecting said passageways, one-way flow means for permitting fluid flow from said second passageway to said brake pipe and preventing flow in the reverse direction, selector valve means comprising a cylindrical spool-type shuttle valve element subject opposingly to pressure of fluid in said pressure chamber and a resilient means and operative to connect said brake cylinder or said emergency reservoir selectively to said first passageway according to whether pressure in said pressure chamber is respectively below or above said chosen value, said shuttle valve element being so constructed as to establish such connections irrespective of whether said valve element is disposed with its one axial end or the opposite axial end exposed to pressure of fluid in said pressure chamber.

3. In a fluid pressure brake apparatus, a brake pipe, an auxiliary reservoir, an emergency reservoir, a brake cylinder device, service valve means responsive to a reduction in brake pipe pressure below auxiliary reservoir pressure to move to a service position for supplying fluid under pressure from said auxiliary reservoir to said brake cylinder device and responsive to a subsequent increase in brake pipe pressure above auxiliary reservoir pressure to move to a release position for releasing brake cylinder pressure and recharging said auxiliary and emergency reservoirs, high pressure valve means subject to opposing pressures of fluid in said brake pipe and in a first chamber and responsive to charging of said chamber and venting of said brake pipe to connect said emergency reservoir with said brake cylinder device and responsive to recharging of said brake pipe after pressure is released from said chamber to disestablish such connectoin, a volume having restricted fluid pressure communication with said brake pipe, a first passage, a helical spring, accelerated release selector valve means subject to opposing pressures of fluid in said volume and of said spring and operative to connect said first passage selectively to said brake cylinder device or said emergency reservoir according to whether said volume is vented or is charged in excess of a chosen degree, bleed means via which said first chamber is constantly open to atmosphere, a branched conduit, a second passage, emergency valve means responsive to an emergency reduction in brake pipe pressure to supply fluid under pressure from said volume to said conduit and responsive to subsequent charging of said brake pipe to open said first passage to said second passage, vent valve means responsive to charging of said conduit to move to an open position to vent said brake pipe to atmosphere and open said conduit to said first chamber and responsive to release of pressure from said first chamber and conduit and volume via said bleed means to below a chosen value to move to a closed position to close off said brake pipe from atmosphere and terminate fluid pressure communication between said conduit and said first chamber, and valve means providing for flow of fluid under pressure from said second passage to said brake pipe and preventing flow in the reverse direction, said high pressure valve means and said selector valve means comprising identical interchangeable generally cylindrical valve members, each of said valve members having a pair of elongated annular cavities formed in its outer periphery and commencing at equal distances from opposite ends of the valve members and extending axially toward each other, terminating at equal distances from a point equidistant said ends, such as to be of symmetrical end-for-end configuration for permitting reversible assembly into the respective corresponding valve means.

4. The combination according to claim 3, including another volume, choke means via which said other volume is constantly open to atmosphere, another passage, said service valve means being operative in service position to connect said other passage to said other volume and operative in release position to disestablish such connection, and release insuring valve means operative whenever brake pipe pressure exceeds auxiliary reservoir pressure by at least a chosen degree to open said auxiliary reservoir to said other passage for assuring that if said other passage is then opened to said other volume auxiliary reservoir pressure will be rapidly reduced by unrestricted flow into said other volume and thereafter continue to be released at the rate controlled by said choke means until said service valve means moves to release position.

5. In a fluid pressure brake apparatus, a brake pipe, an emergency reservoir, a fluid pressure communication to which fluid under pressure is supplied for applying brakes and from which fluid under pressure is released for releasing brakes, a first passage, bleed means for releasing fluid under pressure from said first passage at a selected rate, a quick action chamber having restricted connection with said brake pipe, a second passage, a helical spring, high pressure valve means, accelerated release selector valve means, said high pressure and selector valve means comprising identical, interchangeable substantially cylindrical valve members each having a pair of elongated annular cavities symmetrically formed in its outer peripheral surface and a pair of coaxially arranged bores extending inwardly equal distances from its respective ends for permitting reversible end-for-end assembly in either of the aforesaid valve means, said high pressure valve means being operative when said brake pipe is charged and said first passage is vented to assume a normal position in which one of said pair of cavities in the respective valve member is open solely to the emergency reservoir and the other is open solely to said communication and responsive to charging of said first passage and venting of said brake pipe during an emergency application of brakes to move to a supply position for connecting said emergency reservoir to said communication via said one cavity, said selector valve means being subject opposingly to quick action chamber pressure and pressure of said spring and operative when said quick action chamber is charged in excess of a chosen degree to assume one position in which one of said pair of cavities of its respective valve member connects the emergency reservoir to said second passage and the other is open solely to said communication and responsive to a reduction in quick action chamber pressure below said chosen degree during an emergency application to move to another position in which said one cavity is disconnected from said second passage and said other cavity connects said communication to said second passage, a third passage, means permitting flow from said third passage to said brake pipe and preventing flow in the reverse direction, and means including emergency valve means responsive to an emergency rate of brake pipe pressure reduction to supply fluid under pressure from said quick action chamber to said first passage for shifting said high pressure valve means to its said supply position and permitting release of quick action chamber pressure at the rate controlled by said bleed means for causing operation of said selector valve means to its said other position and responsive to subsequent recharging of said brake pipe to effect connection of said second passage with said third passage for permitting backdump of fluid under pressure from said communication into said brake pipe via said selector valve means in its said other position.

6. In a fluid pressure brake apparatus, the combination with a brake pipe and a brake cylinder device, of a brake cylinder supply communication, first flow restricting means interposed between said brake cylinder device and a first chamber, second flow restricting means interposed between said supply communication and a second chamber, brake cylinder release valve means normally in one position for opening said supply communication to said brake cylinder device and responsive to a reduction in pressure in said first chamber below the opposing pressure in said second chamber to move to another position for disconnecting said supply communication from said brake cylinder device and venting the latter, a passage, brake cylinder reapplication valve means operative when said brake pipe is charged to assume a normal position for cutting off said passage from said first chamber and responsive to venting of said brake pipe to move in one direction out of normal position to a position for opening said passage to said first chamber and responsive to subsequent application of manual force in the other direction to move through normal position to a third position for cutting off said passage from said first chamber and venting said second chamber and supplying fluid under pressure to said first chamber from said supply communication for shifting said brake cylinder release valve means to its one position, and means manually operable for opening said passage to atmosphere for thereby releasing fluid under pressure from said first chamber provided said reapplication valve means is then in said second position.

7. In a fluid pressure brake apparatus, the combination of a brake pipe, a brake cylinder device, a brake cylinder supply communication, manual release means movable to a release position for releasing fluid under pressure from a passage, brake cylinder release valve means subject opposingly to pressures of fluid in a first chamber and in a second chamber and having a normal position in which said supply communication is open to said brake cylinder device and responsive to a reduction in pressure in said first chamber below that in said second chamber to move to a cut-off position for cutting off said supply communication from said brake cylinder device and releasing fluid under pressure from the latter for releasing brakes, first choke means via which said first chamber is constantly open to said brake cylinder device, second choke means via which said second chamber is constantly open to said supply communication, and brake cylinder reapplication valve means responsive to venting of said brake pipe to assume one position for connecting said first chamber to said passage such that upon operation of said manual release means to release position the resultant reduction in pressure in said first chamber will cause operation of said brake cylinder release valve means to cut-off position, said reapplication valve means being responsive to a subsequent operator-applied force to assume another position for cutting off said passage from said first chamber and also supplying fluid under pressure from said supply communication to said first chamber and releasing fluid under pressure from said second chamber for causing operation of said release valve means to normal position for reapplying brakes.

8. In a fluid pressure brake apparatus, a brake pipe, a brake cylinder device, a brake cylinder supply communication, a passage, and manual release valve means manually operable to one position for connecting one end of said passage to atmosphere and normally biased to another position for disestablishing such connection, in combination with brake cylinder release valve means normally biased to one position for opening said supply communication to said brake cylinder device and responsive to a reduction in pressure of fluid in a first chamber below an opposing fluid pressure in a second chamber to disconnect said supply communication from said brake cylinder device, and release fluid under pressure from the latter, first flow restricting means via which said brake cylinder device is constantly open to said first chamber, and second flow restricting means via which said supply communication is constantly open to said second chamber, and a brake cylinder reapplication valve device comprising a flexible diaphragm clamped between sections of a casing and subject opposingly to brake pipe pressure in a third chamber and to atmospheric pressure in a fourth chamber, a coaxially arranged generally cylindrical member having a central bore extending inwardly from one end and closed at the opposite end, said cylindrical member being disposed in said fourth chamber with its closed end engaging said diaphragm, a piston slidably mounted in said bore, a spool valve joined at one end to said piston and slidably mounted in and at its opposite end projecting exteriorly of a bore through the casing, handle means joined to the projecting part of said spool valve, and a helical spring in said fourth chamber for normally urging said piston into contact with the base of the central bore in said member, said reapplication valve device being urged by said spring to one limit position when said third chamber is vented for causing a first elongated cavity in said spool valve to connect said first chamber to the other end of said passage, and responsive to subsequent application of manual force to said handle means to shift said piston and spool valve against pressure of said spring and relative to said cylindrical member to another limit position, defined by engagement of said piston with a stop surface in said fourth chamber for closing off said passage from said first chamber and opening the latter to said supply communication via said first cavity and also opening said second chamber to atmosphere via a second cavity in said spool valve.

9. The combination according to claim 8, wherein so long as said third chamber is charged, said reapplication valve device is adapted to assume a position intermediate its aforesaid limit positions and defined by engagement of the open end of said cylindrical member with the stop surface and operative in this position to open said other end of said passage to said fourth chamber via a third cavity in said spool valve, while said first and second cavities are so disposed as to cut off said first chamber from said passage and supply communication and said second chamber from atmosphere, respectively.

10. In a fluid pressure brake apparatus, a brake pipe, a brake cylinder passage, a brake cylinder supply communication, another passage, manual release valve means operable to one position for connecting said other passage to atmosphere and normally biased to another position for disestablishing such connection, a brake cylinder pressure retaining communication, service valve means operative upon a reduction in brake pipe pressure to a brake applying position in which said retaining communication is closed off from said supply communication and fluid under pressure is supplied to said supply communication, in combination with brake cylinder release valve means comprising a movable abutment, a cylindrical slide valve slidably mounted in a bore in a casing and subject at one end to pressure in an atmospheric chamber and at the opposite end operably connected to said movable abutment, said movable abutment being subject at its side opposite the slide valve to pressure in a control chamber and at the other side to pressure in another chamber, said slide valve having an elongated annular cavity intermediate its ends which is constantly open by way of a restricted passageway to said control chamber, choke means interposed between said other chamber and supply communication, a helical spring urging said slide valve to a normal position against pressure in said other chamber, said slide valve being operative in normal position to blank off one branch of said brake cylinder passage and one branch of said retaining communication and also connect another branch of said brake cylinder passage to said supply communication and control chamber via said cavity, said slide valve being operative upon a reduction in pressure in said control chamber below that in said other chamber to assume a cut-off position in which said one branch of the brake cylinder passage is uncovered to said atmospheric chamber and said cavity disconnects said supply communication from said other branch of the brake cylinder passage and connects the latter branch to said one branch of said retaining communication, and brake cylinder reapplication valve means responsive to venting of said brake pipe to move to one position for connecting said control chamber to said other passage such that operation of said manual release valve means to said one position will effect operation of said slide valve to cut-off position and responsive to subsequent recharging of said brake pipe to move to a normal position for terminating such connection, said service valve means being responsive to recharging of said brake pipe to move to a release position for opening said supply communication to the retaining communication which in event of operation of said slide valve to cut-off position will have been vented and thereby cause a pressure reduction in said other chamber sufficient to enable said spring to shift said slide valve to its said normal position.

11. The combination according to claim 10, wherein said reapplication valve means when in its said one position with said brake pipe vented is manually operable to a manual reapplication position for terminating connection of said control chamber to said other passage and venting said other chamber and supplying fluid under pressure from said supply communication to said control chamber for causing operation of said slide valve to its said normal position.

12. In a fluid pressure brake apparatus, the combination of a brake pipe, an auxiliary reservoir, a brake cylinder device, a brake cylinder supply communication, a volume having constant restricted connection to atmosphere, a release insuring passage, a brake cylinder pressure retaining conduit, service valve means operative upon a reduction in brake pipe pressure below auxiliary reservoir pressure to a service position for closing off said conduit from said supply communication and supplying fluid under pressure to the latter from said auxiliary reservoir and opening said release insuring passage to said volume, brake cylinder release valve means biased to a normal position for opening said supply communication to said brake cylinder device and responsive to a reduction in pressure in a first chamber below an opposing pressure in a second chamber to move to a cut-off position for cutting off said supply communication from said brake cylinder device and venting said brake cylinder device and retaining conduit, first choke means via which said first chamber is constantly open to said brake cylinder device, second choke means via which said second chamber is constantly open to said supply communication, manually operable valve means normally in a closed position but operable to an open position for venting said first chamber, brake cylinder reapplication valve means controlled by brake pipe pressure and operable to disconnect said first chamber from said manually operable valve means except when said brake pipe is substantially vented, said service valve means being responsive to an increase in brake pipe pressure to a value above auxiliary reservoir pressure to move to a release position for recharging said auxiliary reservoir from said brake pipe and connecting said retaining conduit to said supply communication and disconnecting the latter from said auxiliary reservoir and disconnecting said release insuring passage from said volume, and release insuring valve means operative whenever brake pipe pressure exceeds auxiliary reservoir pressure by at least a preselected degree to open said auxiliary reservoir to said release insuring passage such that if the latter is then opened to said volume fluid under pressure from said auxiliary reservoir will be supplied at a rapid rate into said volume and thereafter continue to be released therefrom at a restricted rate to atmosphere until said service valve means moves to its release position.

13. In a fluid pressure brake apparatus, the combination of a brake pipe, an emergency reservoir, an auxiliary reservoir, a brake cylinder device, a brake cylinder supply communication, a brake cylinder retaining communication, a service valve device controlled by opposing pressures of fluid in said brake pipe and auxiliary reservoir and responsive to venting of said brake pipe to move to a service position for cutting off said retaining communication from said supply communication and charging the latter from said auxiliary reservoir, a brake cylinder release valve device biased to a normal position for normally connecting said supply communication to said brake cylinder device and responsive to a reduction in pressure in a first chamber below that in a second chamber to move to a cut-off position for cutting off said supply communication from said brake cylinder device and venting the latter to atmosphere and also venting said retaining communication, first choke means via which said first chamber is constantly open to said first chamber, second choke means via which said second chamber is constantly open to said brake cylinder device, a first passage, bleed means for releasing fluid under pressure from said first passage at a selected rate, a quick action chamber having restricted connection with said brake pipe, a second passage, a helical spring, high pressure valve means, accelerated release selector valve means, said high pressure and selector valve means comprising identical, interchangeable substantially cylindrical valve members each having a pair of elongated annular cavities symmetrically formed in its outer peripheral surface and a pair of coaxially arranged bores extending inwardly equal distances from its respective ends for permitting reversible end-for-end assembly in either of the aforesaid valve means, said high pressure valve means being operative when said brake pipe is charged and said first passage is vented to assume a normal position in which one of said pair of cavities in the respective valve member is open solely to the emergency reservoir and the other is open solely to said supply communication and responsive to charging of said first passage and venting of said brake pipe during an emergency application of brakes to move to a supply position for connecting said emergency reservoir to said supply communication via said one cavity, said selector valve means being subject opposingly to quick action chamber pressure and pressure of said spring and operative when said quick action chamber is charged in excess of a chosen degree to assume one position in which one of said pair of cavities of its respective valve member connects the emergency reservoir to said second passage and the other is open solely to said supply communication and responsive to a reduction in quick action chamber pressure below said chosen degree during an emergency application to move to another position in which said one cavity is disconnected from said second passage and said other cavity connects said supply communication to said second passage, a third passage, check valve means permiting flow from said third passage to said brake pipe and preventing flow in the reverse direction, another fluid pressure communication, a brake pipe vent valve device responsive to charging of said other communication to move to an open position for venting said brake pipe to atmosphere and also connecting said other communication to said first passage and responsive to a reduction in pressure in said other communication and first passage by way of said bleed means to move to a closed position for disconnecting said other communication from said first passage and closing off said brake pipe from atmosphere, an emergency valve device responsive to an emergency reduction in brake pipe pressure to open said quick action chamber to said other communication for causing operation of said vent valve device to open position for reducing quick action chamber pressure and responsive to subsequent supply of fluid under pressure to said brake pipe to move to an accelerated release position for disconnecting said quick action chamber from said other communication and connecting said second passage to said third passage for permitting backdump from said supply communication to said brake pipe via said selector valve means and check valve means, manual release valve means normally closed and operable to an open position for releasing fluid under pressure from said first chamber, brake cylinder reapplication valve means for closing off said first chamber from said manual release valve means except when said brake pipe is vented, a volume, third choke means via which said volume is constantly open to atmosphere, a release insuring passage opened to said volume by said service valve device when in service position, said service valve device being responsive to an increase in brake pipe pressure over auxiliary reservoir pressure to move to a release position for cutting off said auxiliary reservoir from said supply communication and opening the latter to said retaining communication and cutting off said release insuring passage from said volume, and release insuring valve means operative to open said release insuring passage to said auxiliary reservoir only if brake pipe pressure exceeds auxiliary reservoir pressure by a chosen degree for thereby assuring that if said service valve device is not then in release position auxiliary reservoir pressure will be dumped into said volume and continue to be released via said third choke means until said service valve device moves to release position.

14. A fluid pressure brake apparatus comprising, in combination, a brake pipe, an auxiliary reservoir, a quick service volume having restricted connection with the atmosphere, service valve means comprising two valves having a lost motion connection therebetween, one of said valves being movable relative to the other of said valves responsively to an initial reduction in brake pipe pressure below the pressure in said auxiliary reservoir for causing said brake pipe to be opened to said quick service volume to effect a local quick service reduction in brake pipe pressure and thus cause movement of said two valves in unison to a service position for causing fluid under pressure to be supplied from said auxiliary reservoir for applying brakes, said one valve thereafter being movable relative to said other valve to a service lap position for terminating such supply from said auxiliary reservoir when auxiliary reservoir pressure has reduced to approximately the value of brake pipe pressure, said two valves thereafter being movable in unison to a release position responsively to a subsequent increase in brake pipe pressure over auxiliary reservoir pressure for recharging said auxiliary reservoir from said brake pipe, release insuring valve means, means including said service valve means and release insuring valve means defining a fluid pressure communication through which fluid under pressure may be released from said auxiliary reservoir into said quick service volume, said release insuring valve means normally closing said communication and operative only when brake pipe pressure exceeds auxiliary reservoir pressure by at least a chosen degree to permit flow through said communication, said valves of said service valve means normally closing said communication independently of said release insuring valve means and being operative only in said service and service lap positions to permit flow through said communication, whereby said communication will be opened only if brake pipe pressure exceeds auxiliary reservoir pressure by said chosen degree while said valves of said service valve means are in service or service lap position.

References Cited in the file of this patent

UNITED STATES PATENTS

| | | |
|---|---|---|
| 1,185,947 | Snyder | June 6, 1916 |
| 1,469,585 | McCune | Oct. 2, 1923 |
| 1,935,808 | McCune | Nov. 21, 1933 |
| 2,052,188 | McClure | Aug. 25, 1936 |
| 2,476,054 | Loweke | July 12, 1949 |
| 2,490,998 | Sexton | Dec. 13, 1949 |
| 2,530,723 | Pickert | Nov. 21, 1950 |
| 2,713,989 | Bryant | July 26, 1955 |